UNITED STATES PATENT OFFICE.

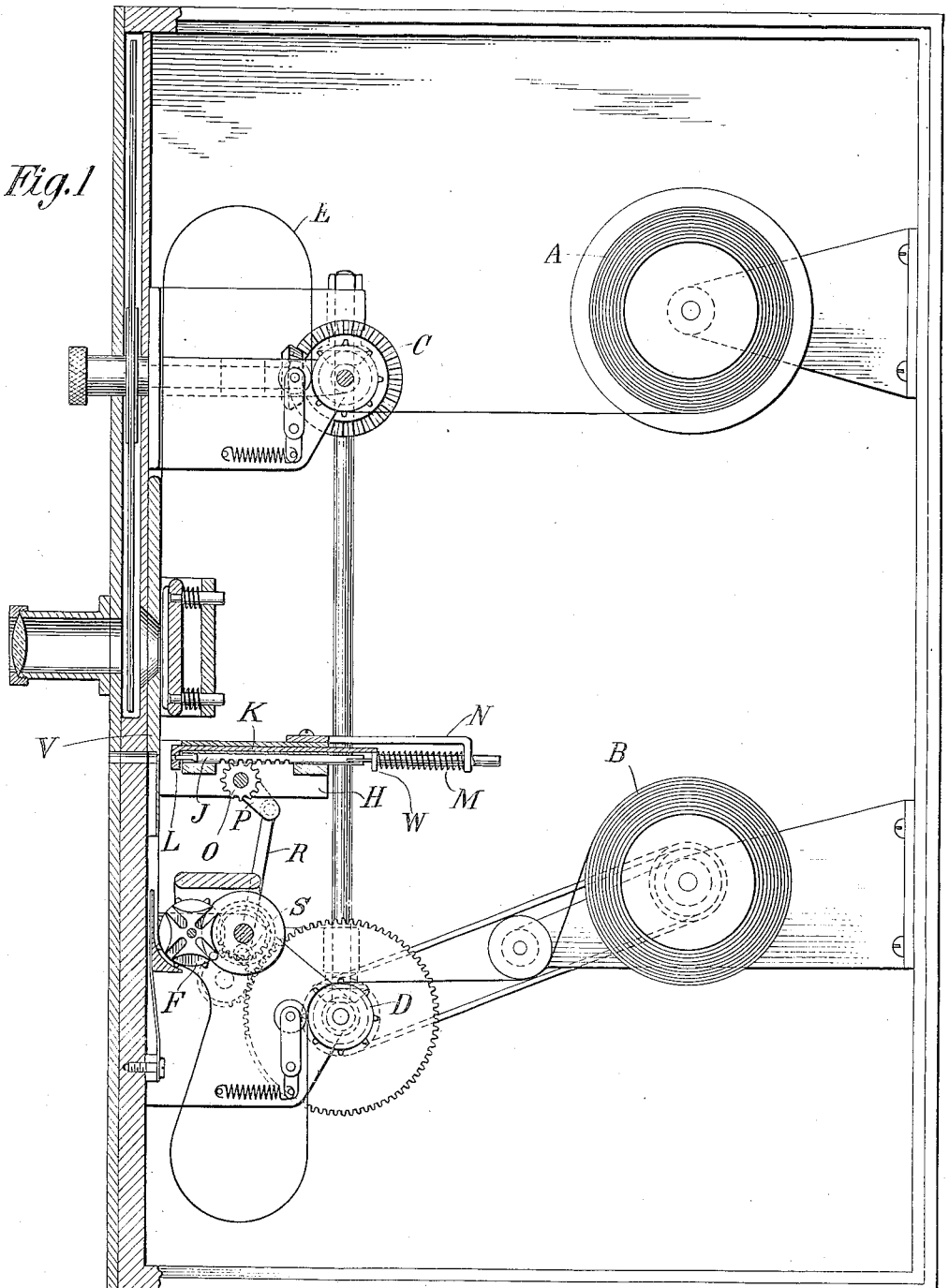

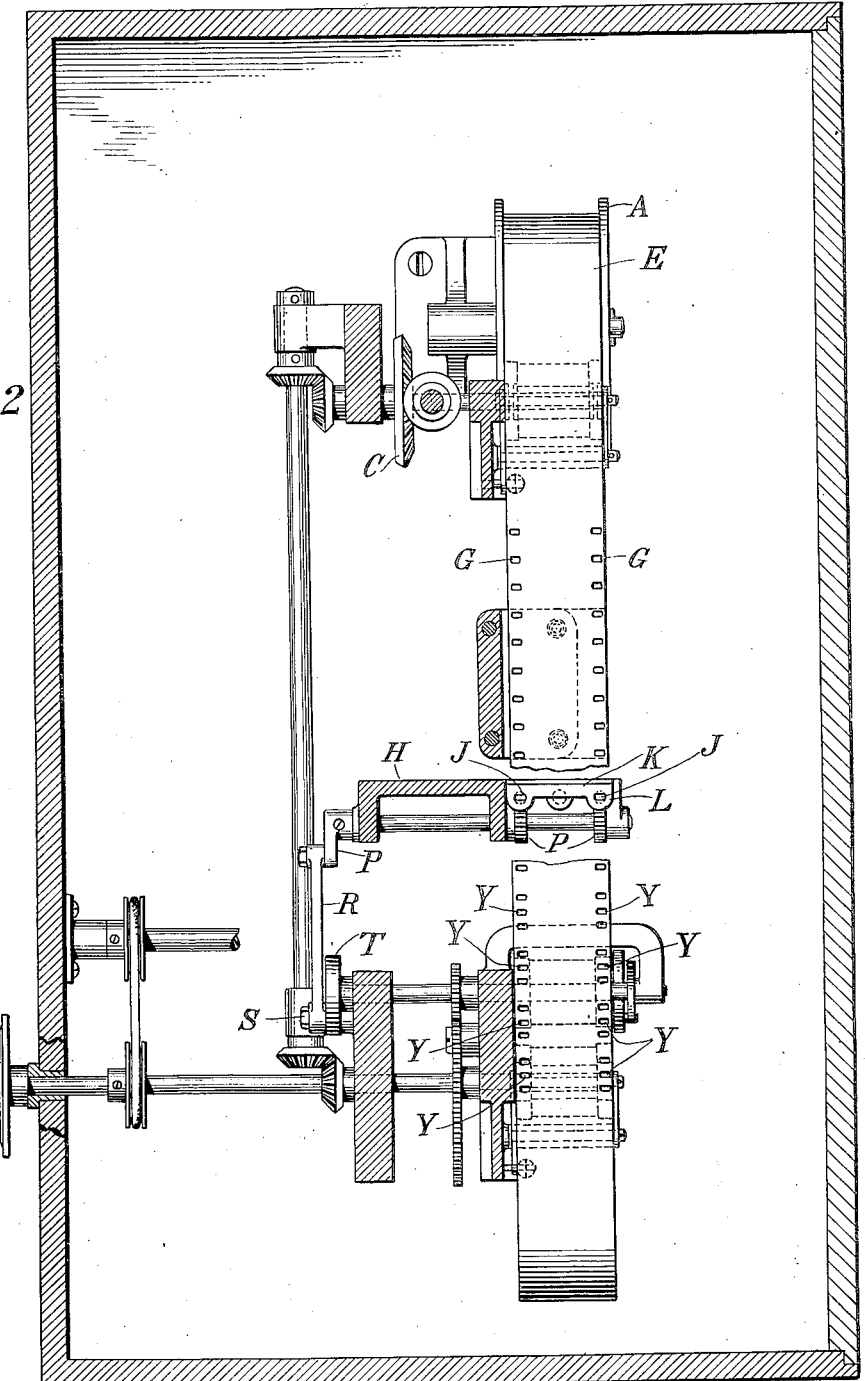

HERMAN CASLER, OF CANASTOTA, NEW YORK, ASSIGNOR TO BIOGRAPH COMPANY, OF NEW YORK, N. Y., A CORPORATION OF NEW JERSEY.

MOTION-PICTURE CAMERA.

1,151,566.  Specification of Letters Patent.  Patented Aug. 31, 1915.

Application filed November 9, 1912. Serial No. 730,331.

*To all whom it may concern:*

Be it known that I, HERMAN CASLER, a citizen of the United States, residing at Canastota, county of Madison, and State of New York, have invented certain new and useful Improvements in Motion-Picture Cameras, of which the following is a full, clear, and exact description.

The invention, subject of this application for Letters Patent, is an improvement which finds its chief importance and value in its application to cameras for taking a series of instantaneous photographs of moving objects on long perforated films such as are now commonly used in the moving picture art. Such instruments involve as their most essential elements an intermittently operated positive feed device for advancing the film by sections of predetermined and equal length, and means for instantaneously exposing each section during its period of rest. Economical and practical considerations demand not only that the successively exposed sections of film shall be of substantially uniform length, but that the position of the pictures on each such section shall be the same with reference to the perforations in the film, otherwise, since the positive reproductions which are run through the exhibiting or projecting machine are exact facsimiles of the negative films, the projected picture will not be brought to precisely the same point with respect to the optical axis and a quivering of the same on the screen results. But while the means now employed for taking and reproducing moving pictures have been carried to a high degree of perfection, the peculiar character of the films, and the inherent defects of even the most accurately designed and constructed feed mechanisms, frequently introduce errors of feed and result in displacement of the pictures with respect to the perforations along the edge of the film which though slight in themselves become magnified in projection to an extent sufficient to impair the illusive effect which it is the object of the art to produce. To illustrate by a specific case. The sensitized films, having been perforated along their edges are run through a camera containing feed sprockets, the teeth of which engage with such perforations and thus determine the length of the exposed sections and the position of the impressions relative to the perforations. Positive prints on similar sensitized perforated films are then obtained from the negatives by the use of printing machines, and these positives are then run through a projecting machine in which there are feed sprockets similar to those in the camera, and which engage with perforations in as nearly as possible the same relation to the pictures as those in the negative films. If an error of displacement of a picture occurs in the negative it may be corrected by a displacement of corresponding extent but opposite direction in either the printing or the projecting machine, all of which employ feed mechanism of substantially the same kind, but the possibility always exists that any given error of this character may be magnified rather than corrected, and it is mainly for the purpose of minimizing such possible sources of error that my present invention is designed.

In carrying out my improvement I use a film with one or more rows of perforations of the usual kind, by the engagement with which of the teeth of the sprockets in the camera the film is fed. I employ in the camera, however, a device for making a definite register mark, preferably a perforation or two perforations near opposite edges of the film while the latter is at rest, and at exactly the same point or points with reference to the impressions and the optical axis of the instrument regardless of any possible displacement of such impressions with respect to the original perforations. In the operation of printing a positive from this negative film these register marks or perforations are utilized in treating the pictures in exact relation to the perforations for the feed sprockets.

Referring now to the drawings, Figure 1 is a sectional side elevation of a camera embodying my improvement, and Fig. 2 a sectional front elevation of the working parts of the same.

The instrument illustrated is one of usual and well known construction, comprising a supply reel A, a frictionally driven take-up reel B, continuously driven sprockets C and D which form and maintain a loop of slack film E, and an intermittently operated sprocket F which feeds this slack loop section-by-section across the optical axis of the instrument. The sprockets C, D, and F, are provided with teeth engaging with the usual perforations G punched along the edges of the film. Adjacent to the exposure opening, and preferably immediately behind, is a bracket H supporting in a suitable guide way a punch J and stripper K, both movable freely in a horizontal direction. The stripper K is a plate with a downwardly extending flange or foot L, and is normally impelled toward the film by a spiral spring M carried by an arm N, extending rearwardly from the bracket H. The punch J is formed with a toothed rack engaging with a pinion O, oscillated by a crank arm P, connected by a rod R with an eccentric pin S on one of the members T of the train that effects the feed of the film. These parts are so designed and adjusted that after the film has been brought to rest by the intermittent feed sprocket, the punch is advanced toward the film thus permitting the stripper to advance until its foot presses the film against a perforated guide plate V. The continued advance of the punch carries it through the presser foot and causes it to punch two holes in the film. It is then withdrawn, leaving the stripper in contact with the film, until its near end comes into engagement with the head W to which the stripper is attached and forces the latter backward out of contact with the film. By this means there will be formed a series of holes Y in the nature of register marks, each of which bears a definite and fixed relation to the adjacent picture obtained from the impression received during the interval of rest in which the hole was punched.

In a previous patent granted to me, No. 629,063, dated July 18, 1899, I have shown a friction feed mechanism in a camera and a device for punching holes in the film during the intervals of rest, which holes, having a definite relation to the pictures, are utilized in the operation of printing to secure uniformity of relation between the pictures and the perforations in the film with which the feed sprockets of the projecting machine are depressed to engage. In such cameras, however, the power required to drive the feed mechanism is much greater than that demanded for the operation of sprocket machines, while they are also subject to the objections and dangers incident to all friction feed devices of this kind, due to the generation of static or frictional electricity. By the combination with positive or sprocket feed mechanism of the marking or punching mechanism described, moreover, not only is a more nearly uniform spacing of pictures secured by the action of the sprockets, but slight displacements of individual pictures, resulting from irregularity in perforation or imperfect action of the feed mechanism are corrected and much more perfect positive films obtained.

In all sprocket feed machines, it will be observed, much greater uniformity of spacing is secured than in friction feed machines, for the reason that in the former the feed is dependent upon the number of perforations in a given length of film. The primary object of my invention, therefore, is not to secure uniformity of feed, but a definite and fixed relation between the pictures and the perforations in the positive film. For this purpose the register marks or holes are alone utilized in printing for spacing the pictures with reference to such perforations.

What I claim is:

1. In a motion picture camera, the combination with mechanism for positively engaging and feeding a perforated picture film, of mechanism for producing during the periods of exposure of the film register marks at the edge or edges thereof in fixed relation to the pictures impressed and in independent relation to the feed perforations.

2. In a motion picture camera, the combination with mechanism for positively engaging and intermittently feeding a perforated picture film, of mechanism for producing during the intervals of rest of the film register marks at the edge or edges thereof in fixed relation to the pictures impressed and in independent relation to the perforations.

3. In a motion picture camera, the combination with mechanism for positively engaging and intermittently feeding a perforated picture film, of mechanism for punching, during the intervals of rest of the film, perforations along the edge or edges of the same, in fixed relation to the pictures impressed thereon and in independent relation to the feed perforations.

4. In a motion picture camera, the combination with mechanism for positively engaging and intermittently feeding a perforated picture film, of punching mechanism in gear with the feed mechanism and adapted to punch, during the intervals of rest of the film, register holes in the edges of the same, in fixed relation to the pictures impressed upon the film and in independent relation to the feed perforations.

In testimony whereof I affix my signature in the presence of two subscribing witnesses.

HERMAN CASLER.

Witnesses:
HARRY HULL,
HAZEL WAUGH.